(12) United States Patent
Duchesne et al.

(10) Patent No.: US 12,367,057 B2
(45) Date of Patent: Jul. 22, 2025

(54) SCALING A HOST VIRTUAL COUNTER AND TIMER IN A VIRTUALIZED COMPUTER SYSTEM

(71) Applicant: VMware, Inc., Palo Alto, CA (US)

(72) Inventors: Regis Duchesne, Monts-de-Corsier (CH); Andrei Warkentin, South Elgin, IL (US); Cyprien Laplace, Boston, MA (US); Ye Li, Cambridge, MA (US); Shruthi Muralidhara Hiriyuru, Medford, MA (US); Alexander Fainkichen, Southborough, MA (US); Sunil Kumar Kotian, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 849 days.

(21) Appl. No.: 17/559,313

(22) Filed: Dec. 22, 2021

(65) Prior Publication Data
US 2023/0195487 A1 Jun. 22, 2023

(51) Int. Cl.
*G06F 9/455* (2018.01)
(52) U.S. Cl.
CPC ............ *G06F 9/45558* (2013.01); *G06F 2009/45583* (2013.01)
(58) Field of Classification Search
CPC ....... G06F 9/45558; G06F 2009/45583; G06F 9/4555
See application file for complete search history.

(56) References Cited

U.S. PATENT DOCUMENTS

| | | | | |
|---|---|---|---|---|
| 7,865,893 B1* | 1/2011 | Omelyanchuk | ..... | G06F 9/45545 718/1 |
| 2008/0177974 A1* | 7/2008 | Chiang | ............... | G06F 12/1018 711/E12.002 |
| 2010/0251235 A1* | 9/2010 | Ganguly | ............. | G06F 9/45558 718/1 |
| 2010/0281273 A1* | 11/2010 | Lee | ......................... | F04B 33/00 713/193 |
| 2013/0219389 A1* | 8/2013 | Serebrin | ............. | G06F 9/45533 718/1 |
| 2017/0286152 A1* | 10/2017 | Matsumoto | ........... | G06F 9/4825 |

\* cited by examiner

*Primary Examiner* — Jorge A Chu Joy-Davila
(74) *Attorney, Agent, or Firm* — Kim & Stewart LLP

(57) ABSTRACT

An example method of virtualizing a host virtual counter and timer in a central processing unit (CPU) of a virtualized host computer includes: creating, by a hypervisor of the host computer in response to power on of a virtual machine (VM), a guest virtual counter, the guest virtual counter comprising a data structure including scaling factors; mapping a shared memory page having the data structure into an address space of memory allocated to the VM; and notifying a guest operating system (OS) of the VM of a location in the address space for the shared memory page having the data structure, the guest OS being paravirtualized to scale the host virtual counter and timer based on the scaling factors of the guest virtual counter.

20 Claims, 7 Drawing Sheets

SCALING A HOST VIRTUAL COUNTER AND TIMER IN A VIRTUALIZED COMPUTER SYSTEM

BACKGROUND

Computer virtualization is a technique that involves encapsulating a physical computing machine platform into virtual machine(s) executing under control of virtualization software on a hardware computing platform or "host." A virtual machine (VM) provides virtual hardware abstractions for processor, memory, storage, and the like to a guest operating system. The virtualization software, also referred to as a "hypervisor," incudes one or more virtual machine monitors (VMMs) to provide execution environment(s) for the virtual machine(s). As physical hosts have grown larger, with greater processor core counts and terabyte memory sizes, virtualization has become key to the economic utilization of available hardware.

Host central processing units (CPUs) can include timer-counter circuits, which an operating system (OS) can utilize to track the passage of time. These timer-counter circuits only track the passage of time and typically do not report the time or date (a host can include a real-time clock (RTC) for the purpose of tracking time and date). Some CPUs, such as those compatible with the ARM®v8 hardware architectures, include both a physical counter and timer and a virtual counter and timer. Physical timers compare against a system count of a physical counter. Virtual timers compare against a virtual count that can be offset from the system count (i.e., a count derived from the system count). The virtual count allows a hypervisor to show virtual time to a VM, which can be offset from the system time of the host. Some CPUs (e.g., ARMv8 CPUs) do not provide a way to scale the virtual count. Scaling the virtual count may be desirable in cases where the hypervisor wants to warp guest time (e.g., make guest timer elapse at a different pace) or in cases where a VM migrates from one host to another, where the virtual counter in the destination host has a different frequency than the virtual counter in the source host.

SUMMARY

One or more embodiments provide a method of virtualizing a host virtual counter and timer in a central processing unit (CPU) of a virtualized host computer. The method includes: creating, by a hypervisor of the host computer in response to power on of a virtual machine (VM), a guest virtual counter, the guest virtual counter comprising a data structure including scaling factors; mapping a shared memory page having the data structure into an address space of memory allocated to the VM; and notifying a guest operating system (OS) of the VM of a location in the address space for the shared memory page having the data structure, the guest OS being paravirtualized to scale the host virtual counter and timer based on the scaling factors of the guest virtual counter.

One or more embodiments provide a method of virtualizing a host virtual counter and timer in a central processing unit (CPU) of a virtualized host computer, the host computer including a hypervisor supporting a virtual machine (VM). The method includes: receiving, at a guest operating system (OS) executing in the VM, a notification from the hypervisor of a location in an address space of memory allocated to the VM by the hypervisor of a guest virtual counter; detecting, by the guest OS, a request to access the host virtual counter and timer by an application; and executing, in response to the request, a paravirtualized function, the paravirtualized function reading at least one parameter from a data structure of the guest virtual counter to modify the access of the host virtual counter and timer.

Further embodiments include a computer system configured to carry out the above method(s). Though certain aspects are described with respect to VMs, they may be similarly applicable to other suitable physical and/or virtual computing instances.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Techniques for scaling a host virtual counter and timer in a central processing unit (CPU) of a virtualized computer system are described. The host virtual counter and timer tracks a virtual count, which is offset from a system count generated by a system counter in the CPU. The host virtual counter and timer includes one or more virtual timers that compare against the virtual count. The counter and timer circuits of the CPU do not provide a mechanism for scaling the host virtual counter and timer. In embodiments, the virtualized computer system includes a hypervisor that exposes guest virtual counters to virtual machines (VMs). A guest virtual counter comprises a data structure stored in a memory page shared between the hypervisor and a VM. The data structure includes parameters, such as a frequency of the guest virtual counter and scaling factors. A guest operating system (OS) executing in a VM is paravirtualized to modify access of the host virtual counter and timer by applications executing in the VM based on the parameters of the guest virtual counter. In an embodiment, the guest OS is paravirtualized to scale the host virtual counter and timer based on scaling factors of the guest virtual counter. The hypervisor can modify the scaling factors as needed. For example, the hypervisor can modify the scaling factors to warp guest time (cause guest time to move faster or slower). In another example, the hypervisor can modify the scaling factors in response to migration of a VM from a source host to a destination host, where the destination host has a different system counter frequency than the source host. These and further aspects of the techniques are described below with respect to the drawings.

Figure 1:
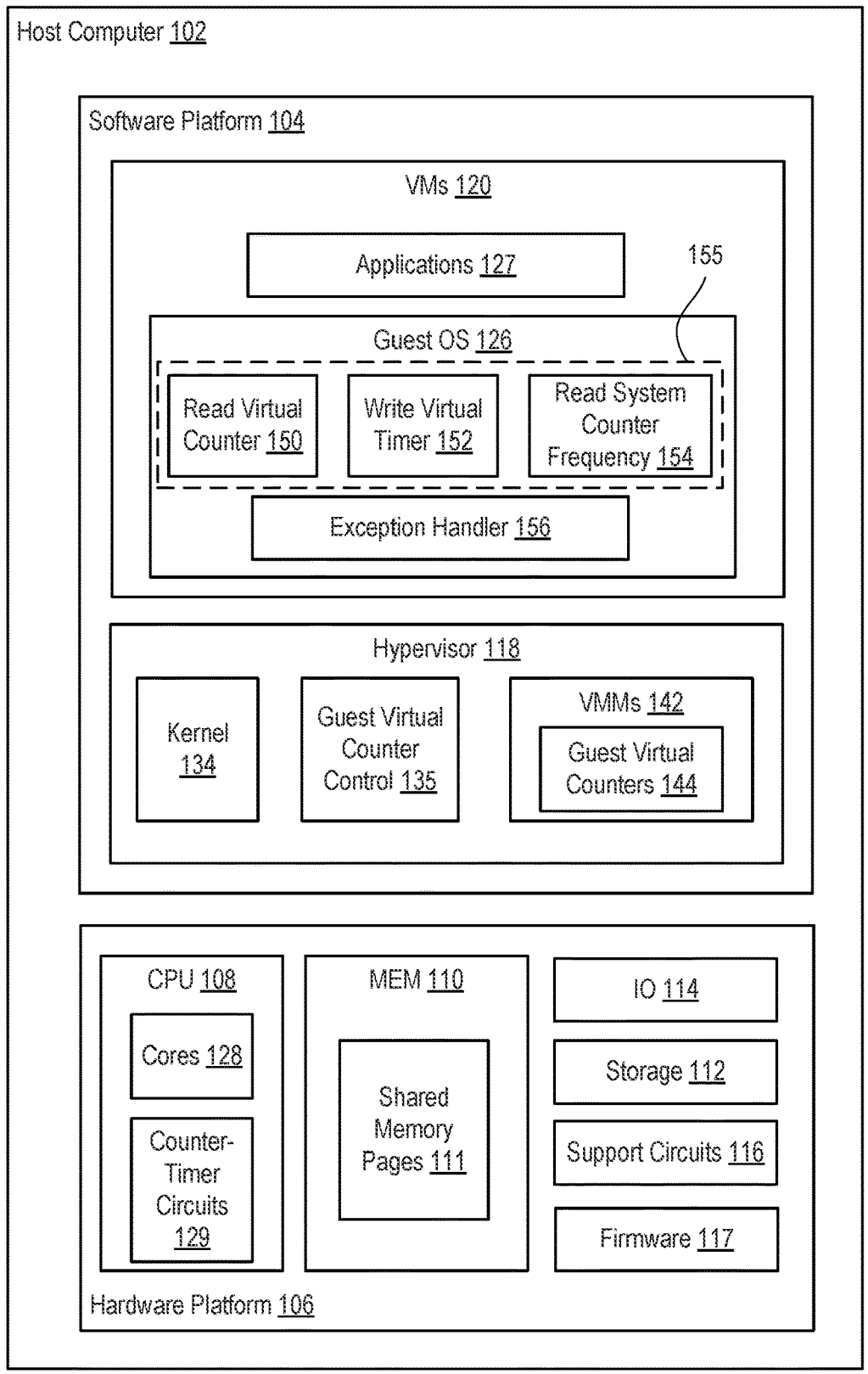
FIG. 1 is a block diagram depicting a virtualized computing system according to an embodiment.

FIG. 1 is a block diagram depicting a virtualized computing system 100 according to an embodiment. Virtualized computing system 100 includes a host computer 102 having a software platform 104 executing on a hardware platform 106. Hardware platform 106 may include conventional components of a computing device, such as a central processing unit (CPU) 108, system memory (MEM) 110, a storage system (storage) 112, input/output devices (TO) 114, and various support circuits 116. CPU 108 is configured to execute instructions, for example, executable instructions that perform one or more operations described herein and may be stored in system memory 110 and storage system 112. System memory 110 is a device allowing information, such as executable instructions, virtual disks, configurations, and other data, to be stored and retrieved. System memory 110 may include, for example, one or more random access memory (RAM) modules. Storage system 112 includes local storage devices (e.g., one or more hard disks, flash memory modules, solid state disks, and optical disks) and/or a storage interface that enables host computer 102 to communicate with one or more network data storage systems. Examples of a storage interface are a host bus adapter (HBA) that couples host computer 102 to one or more storage arrays, such as a storage area network (SAN) or a network-attached storage (NAS), as well as other network data storage systems. Storage 112 in multiple hosts 102 can be aggregated and provisioned as part of shared storage accessible through a physical network (not shown). Input/output devices 114 include conventional interfaces known in the art, such as one or more network interfaces. Support circuits 116 include conventional cache, power supplies, clock circuits, data registers, and the like. Firmware 117 controls initialization of hardware platform 106 and handoff of execution to hypervisor 118 upon power on of host computer 102.

CPU 108 includes one or more cores 128 and counter and timer circuits 129 (among other components not shown for simplicity). Each core 128 is a microprocessor, such as a microprocessor compliant with the ARMv8 architecture or the like. Code is executed by a core 128 at a particular privilege level (PL) of a hierarchy of privilege levels. In an embodiment, CPU 108 having cores 128 compliant with the ARMv8 architecture or similar includes four exception levels (ELs), which are defined as EL0, EL1, EL2, and EL3 in order of increasing code-execution privilege. Execution at EL0 is referred to as "unprivileged execution" and execution at any of EL1, EL2, and EL3 is referred to as "privileged execution." EL0 is an example of a "user PL;" EL1 is an example of a "supervisor PL;" EL2 is an example of a "hypervisor PL;" and EL3 is an example of a "secure PL." In general, CPU 108 supports a hierarchy of at least three hierarchical privilege levels, including the user PL, the supervisor PL, and the hypervisor PL in order of increasing execution privilege. Various examples described herein refer to a CPU having the ARMv8 hardware architecture and executing in the 64-bit execution state (referred to as AArch64). It is to be understood that the techniques described herein can be employed with CPUs having similar hardware architectures and instruction sets and that such techniques are not limited for use with ARMv8 processors.

Figure 2A:
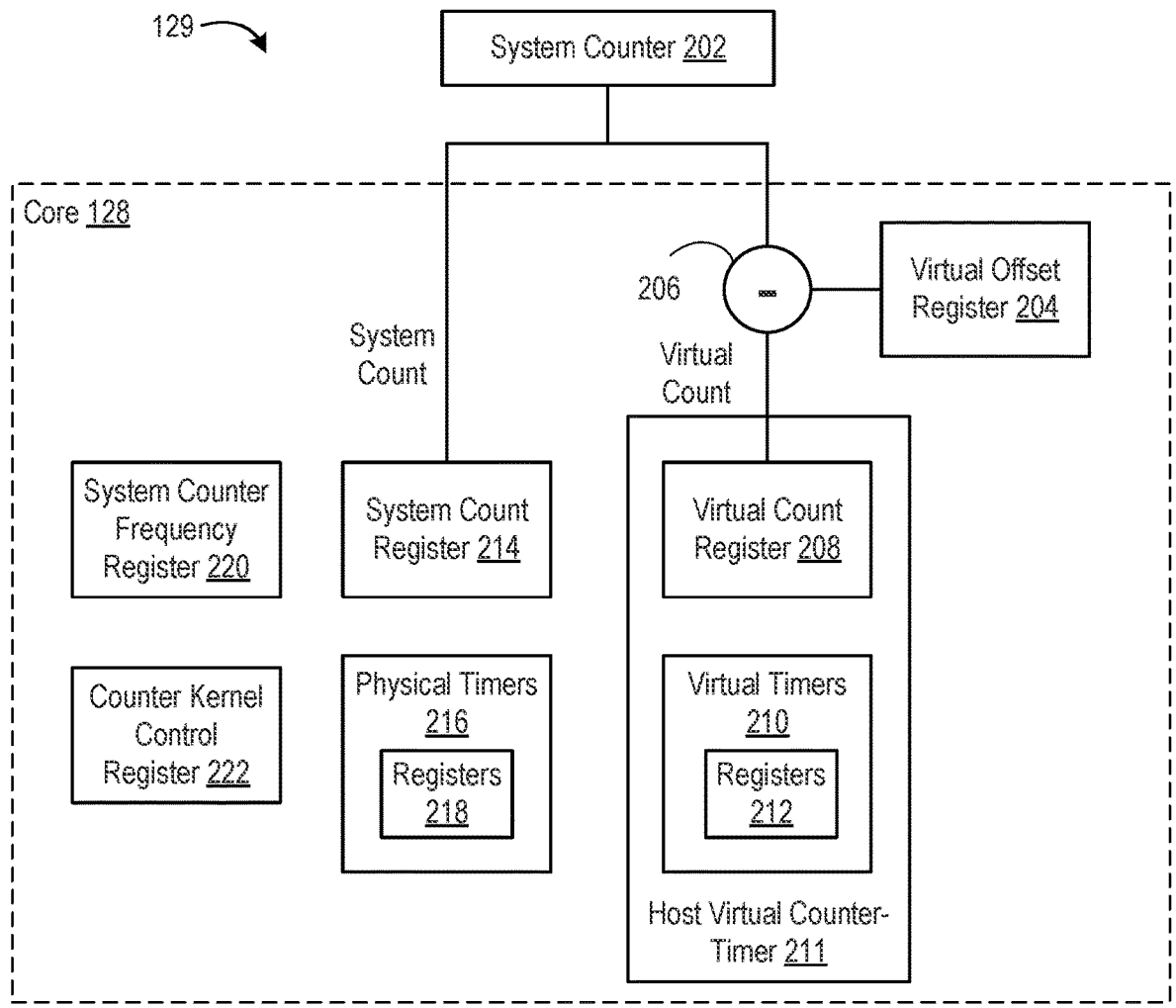
FIG. 2A is a block diagram depicting counter and timer circuits 129 according to an embodiment.

FIG. 2A is a block diagram depicting counter and timer circuits 129 according to an embodiment. Counter and timer circuits 129 include a system counter 202 external to the cores 128. System counter 202 provides a fixed frequency incrementing system count. System counter 202 broadcasts the system count to all cores 128.

Each core 128 includes a system count register 214 configured to store the system count. Each core 128 further includes an offset circuit 206 and a virtual offset register 204. Virtual offset register 204 stores an offset to be applied to the system count to generate a virtual count. In the embodiment, the virtual count equals the system count minus the offset stored in virtual offset register 204. Core 128 includes a virtual count register 208 configured to store the virtual count. In an ARMv8 architecture, for example, system count register 214 is the CNTPCT_EL0, counter and timer physical counter register; virtual count register 208 is the CNTVCT_EL0, counter and timer virtual count register; and virtual offset register 204 is the CNTVOFF_EL2, counter and timer virtual offset register.

Core 128 includes a system counter frequency register 220. System counter frequency register 220 stores the frequency of system counter 202. System counter frequency register 220 is writeable at the highest implemented exception level and readable at all exception levels. In embodiments, firmware 117 executing at EL3 populates system counter frequency register 220 as part of early system initialization. Notably, hypervisor 118, executing at EL2, can only read system counter frequency register 220. A guest OS 126 in a VM 120, executing at EL1, can also read system counter frequency register 220. EL1 reads of system counter frequency register 220 cannot be trapped to EL2. Applications 127, executing at EL0, can read system counter frequency register 220. In embodiments, hypervisor 118 operates such that EL0 reads of system counter frequency register 220 cannot be trapped to EL2. This means that reads of system counter frequency register 220 by applications 127 cannot be detected by hypervisor 118.

In an ARMv8 architecture, for example, system counter frequency register 220 is the CNTFRQ_EL0, counter and timer frequency register. EL0 reads of CNTFRQ_EL0 can only be trapped to EL2 if HCR_EL2.TGE is set. HCR_EL2.TGE (a bit in the HCR_EL2, hypervisor configuration register) can be set to trap general exceptions from EL0 to EL2. However, when set, all exceptions that would be routed to EL1 are instead routed to EL2. This is undesirable, as every EL0 exception to EL1 would cause a VM exit to hypervisor 118 rather than being directly handled by the guest OS. Further, it is not possible to run EL1-mode (kernel mode) code if TGE is set. Thus, in embodiments, hypervisor 118 does not set HCR_EL2.TGE and EL0 reads of CNTFRQ_EL0 cannot be trapped to hypervisor 118 executing at EL2.

Core 128 includes a counter kernel control register 222. EL0 software executing in a VM 120 (e.g., applications 127) can directly read virtual counter register 208 and system counter frequency register 220. Such EL0 reads of the hardware would circumvent virtualization of the virtual count by hypervisor 118 using guest virtual counters 144. As noted above, such reads cannot be trapped to hypervisor 118 executing at EL2 under normal conditions (e.g., HCR_EL2.TGE=0). In embodiments, counter kernel control register 222 includes fields that can be set to trap EL0 reads of virtual count register 208 and system counter frequency register 220 to guest OS 126 executing at ELL Hypervisor 118 sets such fields in counter kernel control register 222 as described below to achieve paravirtualization of the virtual count and prevent applications 127 from directly accessing the hardware registers. In an ARMv8 architecture, for example, counter kernel control register 222 is CNTKCTL_EL1, counter and timer kernel control register. Software (e.g., guest OS or hypervisor) can set CNTKCTL_EL1. {EL0VCTEN, EL0PCTEN} to 00 in order to trap EL0 reads of CNTVCT_EL0 and CNTFRQ_0 to EL1.

Core 128 includes a set of physical timers 216 and a set of virtual timers 210. Physical timers 216 are implemented by registers 218 and virtual timers 210 are implemented by registers 212. These timers include comparators, which compare against the system count or virtual count. Software can configure these timers to generate interrupts or events in set points in the future. Each core 128 includes a host virtual counter and timer 211, which includes virtual count register 208 and virtual timers 210. In general, a host virtual counter and timer is a counter and timer circuit in CPU 108 that includes a counter to track a virtual count and a timer to compare against the virtual count, where the virtual count is offset from a system count.

Figure 2B:
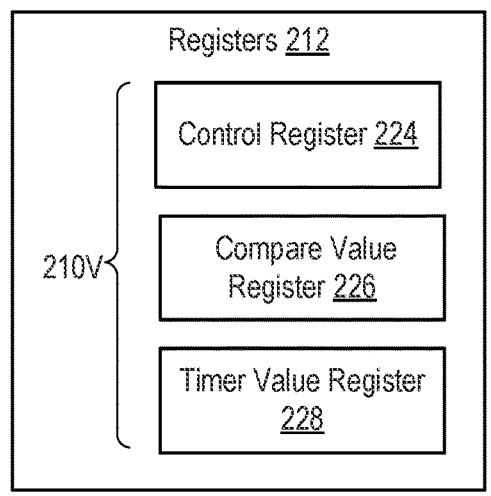
FIG. 2B is a block diagram showing an EL1 virtual timer according to an embodiment.

FIG. 2B is a block diagram showing an EL1 virtual timer 210V of virtual timers 210 according to an embodiment. EL1 virtual timer 210V includes a control register 224, compare value register 226, and time value register 228. Software writes a value to compare value register 226 and EL virtual timer 210V triggers when the virtual count reaches or exceeds that value. Software can write a value to timer value register 228, in which case core 128 reads virtual count register 208 for the virtual count, adds the value in timer value register 228 to the virtual count, and stores the result in compare value register 226. Timer value register 228 decrements down to zero while the virtual count increments. Control register 224 controls the generation of interrupts. Software writes values to fields of control register 224 to enable EL1 virtual timer 210V and enable or disable interrupt generation. Control register 224 can also report when EL1 virtual timer 210V is firing. In an ARMv8 architecture, for example, an EL1 physical timer (CNTP_CTL_EL0, CNTP_CVAL_EL0, and CNTP_TVAL_EL0 registers) and an EL1 virtual timer (CNTV_CTL_EL0, CNTV_CVAL_EL0, and CNTV_TVAL_EL0 registers) are always present. Timers other than EL1 virtual timer 210V are omitted for clarity but are structured the same way.

Returning to FIG. 1, software platform 104 includes a virtualization layer that abstracts processor, memory, storage, and networking resources of hardware platform 106 into one or more virtual machines ("VMs") that run concurrently on host computer 102. The VMs run on top of the virtualization layer, referred to herein as a hypervisor, which enables sharing of the hardware resources by the VMs. In the example shown, software platform 104 includes a hypervisor 118 that supports VMs 120. One example of hypervisor 118 that may be used in an embodiment described herein is a VMware ESXi™ hypervisor provided as part of the VMware vSphere® solution made commercially available from VMware, Inc. of Palo Alto, California (although it should be recognized that any other virtualization technologies, including Xen® and Microsoft Hyper-V® virtualization technologies may be utilized consistent with the teachings herein). Hypervisor 118 includes a kernel 134, guest virtual counter control 135, and virtual machine monitors (VMMs) 142. Kernel code of hypervisor 118 executes at EL2 and unprivileged code of hypervisor 118 executes at EL0.

Each VM 120 includes guest software (also referred to as guest code) that runs on the virtualized resources supported by hardware platform 106. In the example shown, the guest software of VM 120 includes a guest OS 126 and client applications 127. Guest OS 126 can be any commodity operating system known in the art (e.g., Linux®, Windows®, etc.). Client applications 127 can be any applications executing on guest OS 126 within VM 120. Guest OS 126 executes at EL1 and applications 127 typically execute at EL0.

Kernel 134 provides operating system functionality (e.g., process creation and control, file system, process threads, etc.), as well as CPU scheduling and memory scheduling across guest software in VMs 120, VMMs 142, and guest virtual counter control 135. VMMs 142 implement the virtual system support needed to coordinate operations between hypervisor 118 and VMs 120. Each VMM 142 manages a corresponding virtual hardware platform that includes emulated hardware, such as virtual CPUs (vCPUs) and guest physical memory (also referred to as VM memory). Each virtual hardware platform supports the installation of guest software in a corresponding VM 120. Each VMM 142 further maintains page tables (e.g., nested page tables (NPTs)) on behalf of its VM(s), which are exposed to CPU 108.

In an embodiment, VMMs 142 present guest virtual counters 144 to VMs 120. Hypervisor 118 exposes to a VM 120 a guest virtual counter 144 having a frequency fixed at N hertz (Hz), where N is a positive integer. Hypervisor 118 sets the frequency of guest virtual counter 144 for a VM 120 each time VM 120 is powered on. The frequency of guest virtual counter 144 is independent of the frequency of system counter 202 (from which the virtual count is derived). Guest virtual counters 144 are implemented using shared memory pages 111 and paravirtualization in guest OS 126 of each VM 120. Shared memory pages 111 are shared between hypervisor 118 and VMs 120. VMM 142 maps a shared memory page 111 into the guest physical address space of a VM 120. Guest virtual counter control 135 stores a data structure in shared memory page 111, which includes a scaling factor of guest virtual counter 144. Shared memory page 111 is writable by guest virtual counter control 135 and only readable by paravirtualization code 155 in guest OS 126.

Guest OS 126 includes paravirtualization code 155 and an exception handler 156. Paravirtualization as used herein means modifying a guest OS to replace system functions to implement a behavior expected by the hypervisor. Paravirtualization code 155 includes functions that read at least one parameter from guest virtual counter 144 to modify access to host virtual counter and timer 211 by applications 127. In an embodiment, paravirtualization code 155 includes a read virtual counter function 150, a write virtual timer function 152, and a read system counter frequency function 154. Applications 127 call into guest OS 126 for reading the virtual count of host virtual counter and timer 211, writing to EL1 virtual timer 210V, and reading the frequency of system counter 202. Hypervisor 118 installs paravirtualization code 155 in guest OS 126 to prevent applications 127 from directly accessing system counter frequency register 220, virtual count register 208, and EL virtual timer 210V. Read virtual counter function 150 handles calls by applications 127 to read the virtual count of host virtual timer-counter 211 (e.g., the value in virtual count register 208).

Write virtual timer function 152 handles calls by applications 127 to write a compare value to EL1 virtual timer 210V (e.g., compare value register 226). Read system counter frequency function 154 handles calls by applications 127 to read the frequency of system counter 202 (e.g., the value in system counter frequency register 220). As discussed above, hypervisor 118 has configured cores 128 to generate an exception to EL1 in case applications 127 executing at EL0 attempt to directly read system counter frequency register 220 and virtual count register 208. Exception handler 156 invokes read virtual counter function 150 in case an application 127 attempts to directly read virtual count register 208. Exception handler 156 invokes read system counter frequency function 154 in case an application 127 attempts to directly read system counter frequency register 220.

Figure 3:
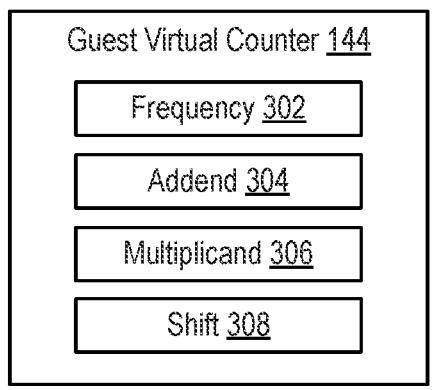
FIG. 3 is a block diagram depicting a guest virtual counter according to an embodiment.

FIG. 3 is a block diagram depicting a guest virtual counter 144 according to an embodiment. Guest virtual counter 144 is a data structure stored in a shared memory page 111. Guest virtual counter 144 has a plurality of parameters, including a frequency 302, an addend 304, a multiplicand 306, and a shift value 308. Guest virtual counter control 135 sets frequency 302 to N when VM 120 powers up (e.g., 100 Mhz). Guest virtual counter control 135 sets values for addend 304, multiplicand 306, and shift 308 to implement scaling of host virtual counter and timer 211 for a VM 120.

Figure 4:
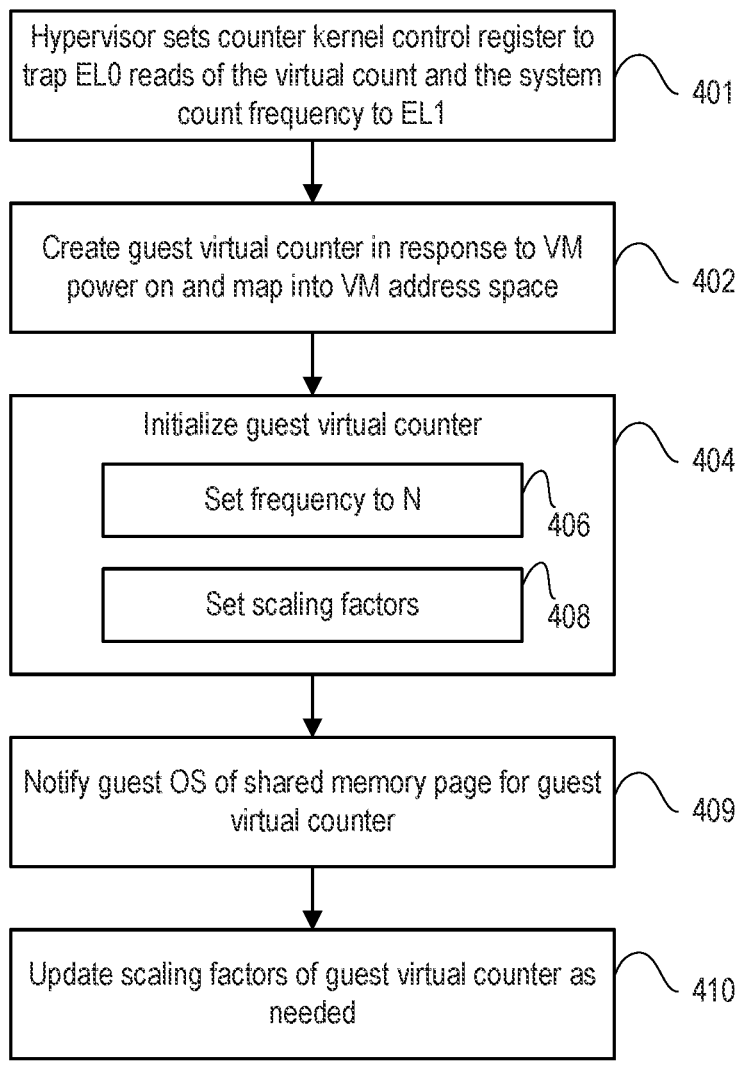
FIG. 4 is a flow diagram depicting a method of scaling host virtual counter and timer according to an embodiment.

FIG. 4 is a flow diagram depicting a method 400 of scaling host virtual counter and timer 211 according to an embodiment. Method 400 begins at step 401, where hypervisor 118 sets counter kernel control register 222 to trap EL0 reads of the virtual count and the system count frequency to EL1. This prevents applications 127 from directly reading virtual count register 208 and system counter frequency register 220, as discussed above.

At step 402, hypervisor 118 creates a guest virtual counter 144 in response to VM power on and maps guest virtual counter 144 into the VM address space (e.g., in a shared page 111). At step 404, hypervisor 118 initializes guest virtual counter 144. Initialization includes: At step 406, hypervisor 118 sets frequency 302 to N. At step 408, hypervisor 118 sets the scaling factors (e.g., addend 304, multiplicand 306, and shift 308) to initial values.

At step 409, hypervisor 118 notifies guest OS 126 of the address of shared memory shared memory page 111 to be writable by hypervisor 118 and read-only by guest OS 126. At step 410, hypervisor 118 updates the scaling factors of guest virtual counter 144 as needed in order to control scaling of host virtual-counter timer 211. For example, hypervisor 118 can update the scaling factors of guest virtual counter 144 for warping guest time or in response to migration of a VM.

Figure 5:
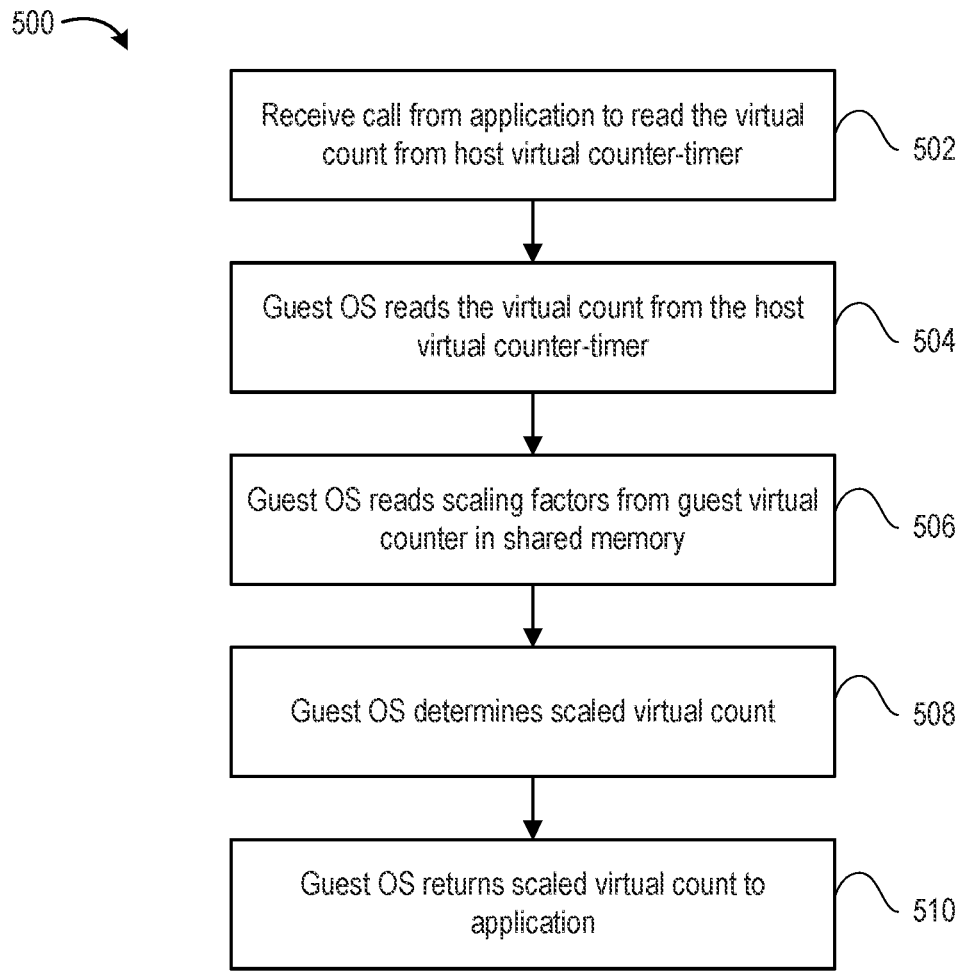
FIG. 5 is a flow diagram depicting a method of virtualizing reads of a virtual count tracked by a host virtual counter and timer in a CPU according to an embodiment.

FIG. 5 is a flow diagram depicting a method 500 of virtualizing reads of a virtual count tracked by a host virtual counter and timer 211 in a CPU 108 according to an embodiment. Method 500 begins at step 502, where guest OS 126 receives a call from an application 127 to read the virtual count from host virtual counter and timer (e.g., read from virtual count register 208). In response, guest OS 126 executes read virtual counter function 150.

At step 504, read virtual counter function 150 reads the virtual count from host virtual counter and timer (e.g., read from virtual count register 208). For example, in an ARMv8 architecture, read virtual counter function 150 executes MRS(CNTVCT_EL0).

At step 506, read virtual counter function 150 reads the scaling factors from guest virtual counter 144 in a shared memory page 111. At step 508, read virtual counter function 150 determines a scaled virtual count as addend 304 plus the quantity multiplicand 306 times the virtual count value right shifted by shift value 308 (e.g., add+(mult*hval>>shift), where add is addend 304, mult is multiplicand 306, hval is the virtual count, and shift is shift 308). At step 510, read virtual counter function 150 returns the scaled virtual count to the calling application 127. In this manner, application 127 receives a scaled version of the virtual count tracked by host virtual counter and timer as determined by hypervisor 118.

Figure 6:
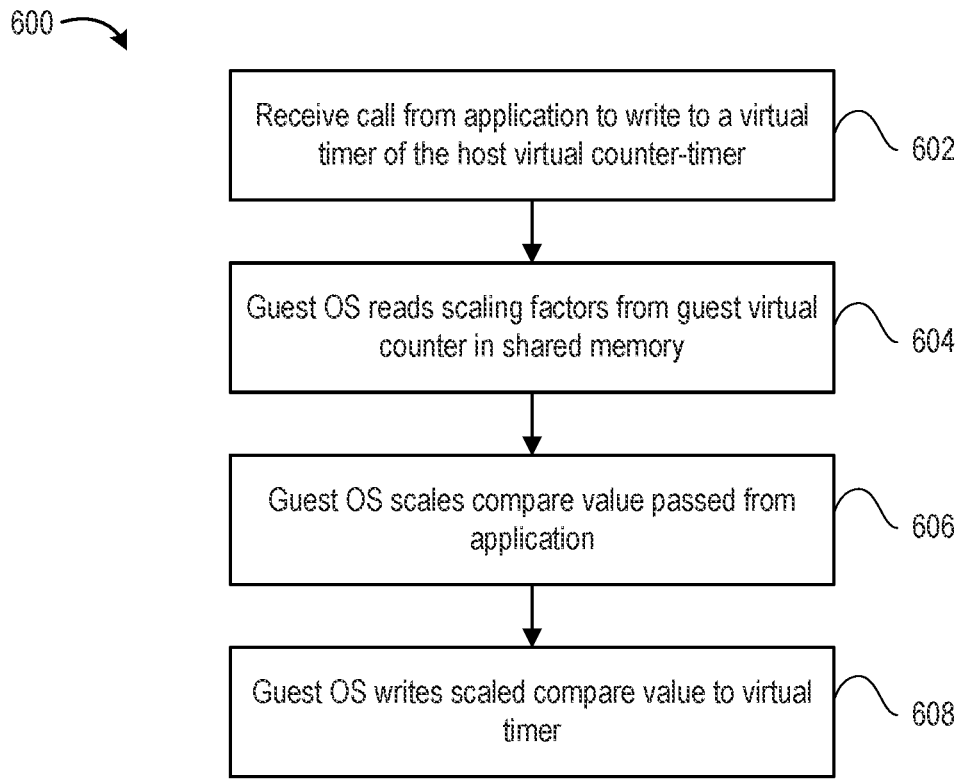
FIG. 6 is a flow diagram depicting a method of virtualizing writes to a virtual timer of a host virtual counter and timer in a CPU according to an embodiment.

FIG. 6 is a flow diagram depicting a method 600 of virtualizing writes to a virtual timer of a host virtual counter and timer 211 in a CPU 108 according to an embodiment. Method 600 begins at step 602, wherein guest OS 126 receives a call from an application 127 to write to a virtual timer (e.g., EL1 virtual timer 210V). In response, guest OS 126 executes write virtual timer function 152.

At step 604, write virtual timer function 152 reads the scaling factors from guest virtual counter 144 in shared memory page 111. At step 606, write virtual timer function 152 scales a compare value received from application 127 as follows: ((gVal−add)<<shift)/mult, where gVal is the compare value passed from application 127, add is addend 304, shift is shift 308, mult is multiplicand 306, and <<denotes a left-shift. At step 608, write virtual timer function 152 writes the scaled compare value to the virtual timer (e.g., to compare value register 226 of EL1 virtual timer 210V). For example, in an ARMv8 architecture, write virtual timer function 152 can execute MSR(CNTV_CVAL_EL0, ((gVal−add)<<shift)/mult). In this manner, application writes a scaled version of the compare value to the virtual timer of host virtual counter and timer 211 as determined by hypervisor 118.

Figure 7:
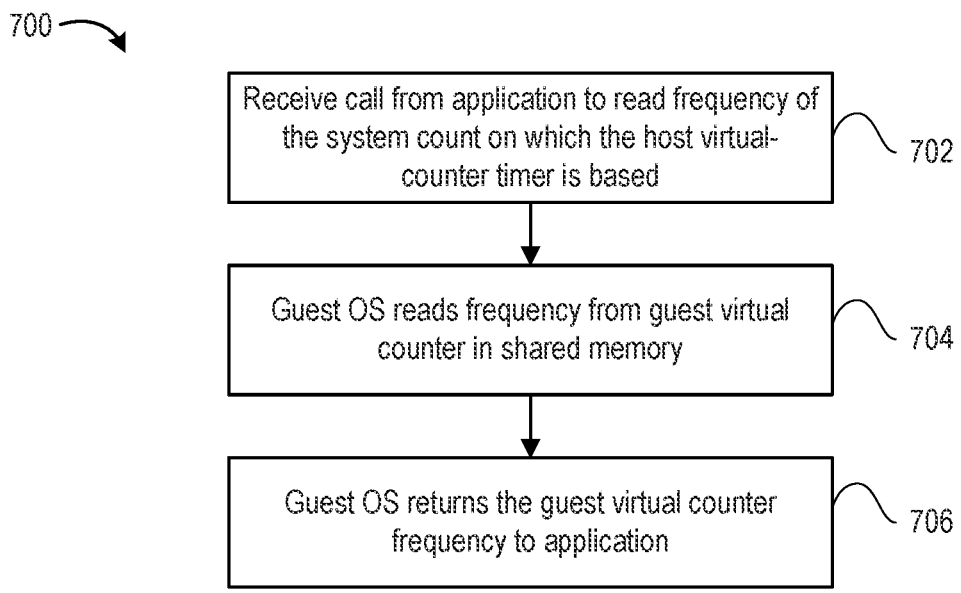
FIG. 7 is a flow diagram depicting a method of virtualizing reads of a system counter frequency of counter and timer circuits in a CPU according to an embodiment.

FIG. 7 is a flow diagram depicting a method 700 of virtualizing reads of a system counter frequency of counter and timer circuits 129 in a CPU 108 according to an embodiment. Method 700 begins at step 702, where guest OS 126 receives a call from an application 127 to read the frequency of the system count (e.g., frequency of system counter 202 from system counter frequency register 220). In response, guest OS 126 executes read system counter frequency function 154. At step 704, read system counter frequency function 154 reads frequency 302 from guest virtual counter 144 in shared memory page 111. At step 706, read system counter frequency function 154 returns frequency 302 to application 127. In this manner, application 127 receives the value of frequency 302 of guest virtual counter 144 as set by hypervisor 118 in place of the frequency of the system count.

Figure 8:
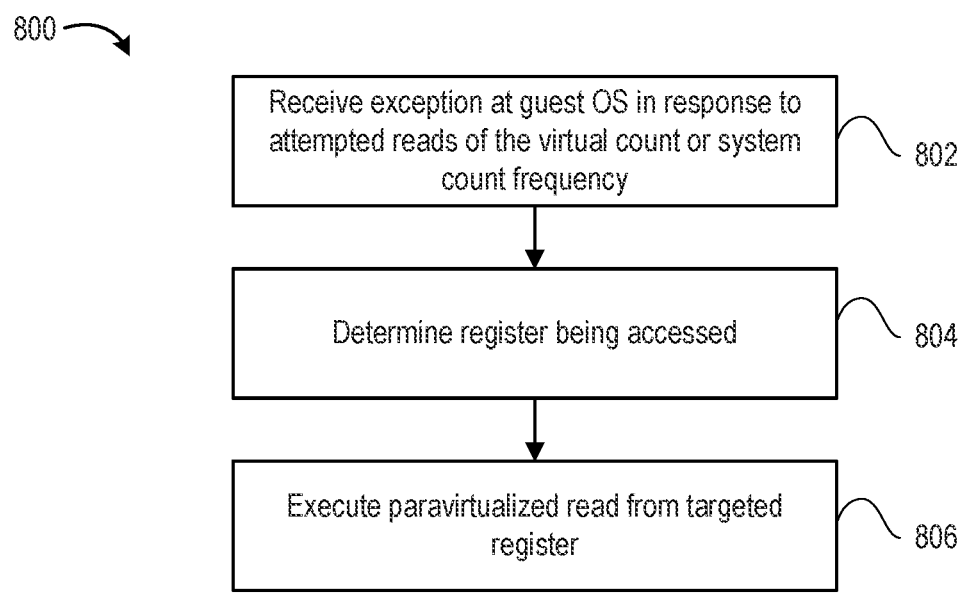
FIG. 8 is a flow diagram depicting a method of handling exceptions at guest OS in response to reads of virtual count register and system counter frequency register according to an embodiment.

FIG. 8 is a flow diagram depicting a method 800 of handling exceptions at guest OS 126 in response to reads of virtual count register 208 and system counter frequency register 220 according to an embodiment. Method 800 begins at step 802, where guest OS 126 receives an exception in response to an application 127 attempting to directly read the virtual count from virtual count register 208 or the system counter frequency from system counter frequency register 220. At step 804, exception handler 156 of guest OS 126 determines which register is being accessed (e.g., either virtual count register 208 or system counter frequency register 220). At step 806, exception handler 156 executes a paravirtualized read from the targeted register. That is, if the read targets virtual count register 208, exception handler 156 calls read virtual counter function 150. If the read targets system counter frequency register 220, exception handler 156 calls read system counter frequency function 154.

Techniques for presenting a guest virtual counter to a VM and for scaling such a guest virtual counter have been described. In embodiments, hypervisor 118 can scale the guest virtual counter to make guest time elapse at a different pace (faster or slower) than host virtual time. To achieve the scaling, hypervisor 118 need only update the scaling factors in the guest virtual counter data structure stored in a shared memory page. In other embodiments, a hypervisor 118 can scale the guest virtual counter to adapt to a change of the host virtual counter due to migration of a VM from a source host to a destination host. In this scenario, the pace of guest time does not change, but the hypervisor needs to adapt to a change in the host timer. To do so, the hypervisor need only update the scaling factor in the guest virtual counter as in the previous scenario. However, the hypervisor must also update the physical system registers that hold a timer value, such as compare value register 226.

Consider the following example: the frequency of the source host system counter is 100 MHz. At the moment the VM state is saved to prepare for migration, assume the value of compare value register 226 minus the virtual count is 100,000,000 (i.e., 1 second in the future). Assume the frequency of the destination host system counter is 200 MHz. At the moment the VM is restored, the hypervisor must ensure that the difference between the value of compare value register 226 and the virtual count is now 200,000,000 (i.e., 1 second in the future). That is, the hypervisor must preserve the timing of the delivery of timer interrupts that have been set by the guest OS. The above conversion can be achieved without storing any host state (such as host timer frequency). During the migration, the hypervisor can assume that the host timer frequency is the guest timer frequency (frequency 302). That is, starting the migration converts values from the source host timer frequency to the guest timer frequency (frequency 302), and ending the migration converts values from the guest timer frequency (frequency 302) to the destination host timer frequency.

Figure 9:
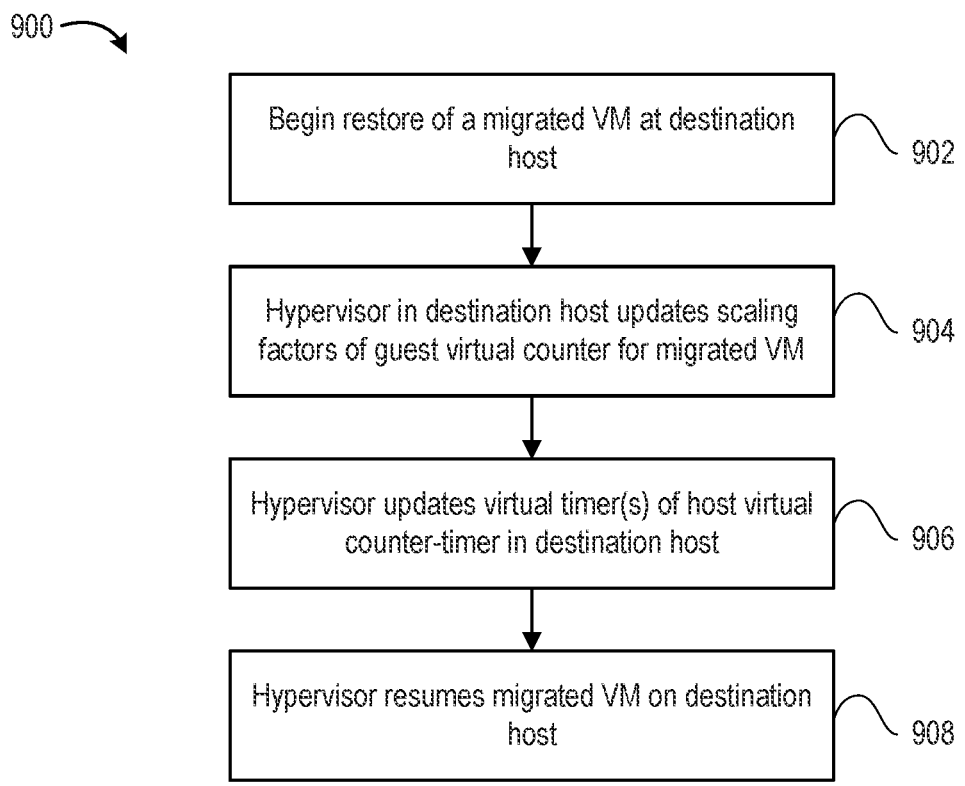
FIG. 9 is a flow diagram depicting a method of scaling a host virtual counter and timer in a destination host after migration of a VM from a source host according to an embodiment.

FIG. 9 is a flow diagram depicting a method 900 of scaling a host virtual counter and timer in a destination host after migration of a VM from a source host according to an embodiment. Method 900 begins at step 902, where hypervisor 118 in the destination host begins restore of the migrated VM. At step 904, hypervisor 118 in the destination host updates the scaling factors (e.g., addend 304, multiplicand 306, shift 308) of guest virtual counter 144 for the migrated VM. Hypervisor 118 adjusts the scaling factors to compensate for a change in frequency of the system count between the source host and the destination host. At step 906, hypervisor 118 updates virtual timer(s) of host virtual counter and timer 211 in the destination host. For example, hypervisor 118 can update the compare value in EL virtual timer 210V (e.g., the value in compare value register 226) based on the change in system count frequency. At step 908, hypervisor 118 resumes the migrated VM on the destination host.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of virtualizing a host virtual counter and timer in a central processing unit (CPU) of a virtualized host computer, the method comprising:
    creating, by a hypervisor of the host computer in response to power on of a virtual machine (VM), a guest virtual counter, the guest virtual counter comprising a data structure including scaling factors, the hypervisor executing at a first privilege level of the CPU;
    mapping a shared memory page having the data structure into an address space of memory allocated to the VM, the shared memory page accessible at a second privilege level of the CPU, the second privilege level being less privileged than the first privilege level; and
    notifying a guest operating system (OS) of the VM of a location in the address space for the shared memory page having the data structure, the guest OS executing at the second privilege level, the guest OS being paravirtualized to access and scale the host virtual counter and timer of the CPU based on the scaling factors of the guest virtual counter in response to trapping access to the host virtual counter and timer by an application in the VM executing at a third privilege level of the CPU, the third privilege level being less privileged than the second privilege level.

2. The method of claim 1, further comprising:
    updating, by the hypervisor, the scaling factors of the guest virtual counter while the VM is powered on.

3. The method of claim 1, wherein the data structure includes a frequency of the guest virtual counter, and wherein the guest OS is paravirtualized to report the frequency of the guest virtual counter in response to a call from the application for a frequency of a system counter of the CPU.

4. The method of claim 1, wherein the CPU includes a system counter tracking a system count and a system counter frequency register storing a frequency of the system counter, wherein the host virtual counter and timer includes a virtual count register tracking a virtual count offset from the system count, and the method further comprises:
    setting, by the hypervisor, a counter kernel control register of the CPU to trap reads of both the virtual count register and the system counter frequency register at the third privilege level to the second privilege level.

5. The method of claim 1, wherein the host virtual counter and timer includes a virtual count register tracking a virtual count offset from a system count, and wherein the guest OS is paravirtualized to return a scaled version of the virtual count based on the scaling factors of the guest virtual counter in response to a call by the application to read the virtual count register.

6. The method of claim 1, wherein the host virtual counter and timer includes a virtual count register tracking a virtual count offset from a system count and a virtual timer comparing against the virtual count, and wherein the guest OS is paravirtualized to write a scaled version of a compare value to the virtual timer based on the scaling factors of the guest virtual counter in response to a call by the application to write to the virtual timer.

7. The method of claim 1, wherein the scaling factors comprise an addend, a multiplicand, and a shift value.

8. A method of virtualizing a host virtual counter and timer in a central processing unit (CPU) of a virtualized host computer, the host computer including a hypervisor supporting a virtual machine (VM), the method comprising:
    receiving, at a guest operating system (OS) executing in the VM, a notification from the hypervisor of a location in an address space of memory allocated to the VM by the hypervisor of a guest virtual counter, the hypervisor executing at a first privilege level of the CPU, the guest OS executing at a second privilege level of the CPU that is less privileged than the first privilege level, the address space accessible at the second privilege level;
    detecting, by the guest OS, a request to access the host virtual counter and timer by an application executing in the VM at a third privilege level, the third privilege level being less privileged than the second privilege level; and
    executing, in response to trapping the request by the application at the guest OS, a paravirtualized function, the paravirtualized function reading at least one parameter from a data structure of the guest virtual counter to modify the access of the host virtual counter and timer.

9. The method of claim 8, wherein the host virtual counter and timer includes a virtual count register tracking a virtual count offset from a system count, wherein the request is a call from the application to read the virtual count, and wherein executing the paravirtualized function comprises:
    reading the virtual count from the virtual count register;
    reading scaling factors from the data structure of the guest virtual counter;
    determining a scaled virtual count by applying the scaling factors to the virtual count; and
    returning the scaled virtual count to the application.

10. The method of claim 8, wherein the host virtual counter and timer includes a virtual count register tracking a virtual count offset from a system count and a virtual timer comparing against the virtual count, wherein the request is a call from the application to write a compare value to the virtual timer, and wherein executing the paravirtualized function comprises:
    reading scaling factors from the data structure of the guest virtual counter;
    applying the scaling factors to scale the compare value passed by the application in the call; and
    writing the scaled compare value to the virtual timer.

11. The method of claim 8, wherein the CPU includes a system counter tracking a system count and a system counter frequency register storing a frequency of the system counter, wherein the request is a call from the application to read the system counter frequency register, and wherein executing the paravirtualized function comprises:
    reading a frequency from the data structure of the guest virtual counter; and
    returning the frequency from the data structure of the guest virtual counter.

12. The method of claim 8, wherein the request is an instruction executed by the application to read a frequency of a system counter in the CPU or to read a virtual count tracked by the host virtual counter and timer, and wherein the method comprises:
    handling, at an exception handler of the guest OS, an exception generated in response to the instruction, the exception handler triggering execution of the paravirtualized function.

13. The method of claim 12, wherein the frequency of the system counter is stored in a system counter frequency register, wherein the instruction is an instruction to read the system counter frequency register, and wherein executing the paravirtualized function comprises:
    reading a frequency from the data structure of the guest virtual counter; and
    returning the frequency from the data structure of the guest virtual counter.

14. The method of claim 12, wherein the virtual count is stored in a virtual count register, wherein the instruction is an instruction to read the virtual count register, and wherein executing the paravirtualized function comprises:
    reading the virtual count from the virtual count register;
    reading scaling factors from the data structure of the guest virtual counter;
    determining a scaled virtual count by applying the scaling factors to the virtual count; and
    returning the scaled virtual count to the application.

15. A virtualized computing system, comprising:
    a hardware platform including a central processing unit (CPU), the CPU having a host virtual counter and timer; and
    a software platform including a hypervisor executing on the hardware platform and a virtual machine (VM) supported by the hypervisor, the hypervisor configured to:
        create, in response to power on of the VM, a guest virtual counter, the guest virtual counter comprising a data structure including scaling factors, the hypervisor executing at a first privilege level of the CPU;
        map a shared memory page having the data structure into an address space of memory allocated to the VM, the shared memory page accessible at a second privilege level of the CPU, the second privilege level being less privileged than the first privilege level; and
        notify a guest operating system (OS) of the VM of a location in the address space for the shared memory page having the data structure, the guest OS executing at the second privilege level, the guest OS being paravirtualized to access and scale the host virtual counter and timer of the CPU based on the scaling factors of the guest virtual counter in response to trapping access to the host virtual counter and timer by an application in the VM executing at a third privilege level of the CPU, the third privilege level being less privileged than the second privilege level.

16. The virtualized computing system of claim 15, wherein the data structure includes a frequency of the guest virtual counter, and wherein the guest OS is paravirtualized to report the frequency of the guest virtual counter in response to a call from the application for a frequency of a system counter of the CPU.

17. The virtualized computing system of claim 15, wherein the CPU includes a system counter tracking a system count and a system counter frequency register storing a frequency of the system counter, wherein the host virtual counter and timer includes a virtual count register tracking a virtual count offset from the system count, and wherein the hypervisor is configured to:
    set a counter kernel control register of the CPU to trap reads of both the virtual count register and the system counter frequency register at the third privilege level to the second privilege level.

18. The virtualized computing system of claim 15, wherein the host virtual counter and timer includes a virtual count register tracking a virtual count offset from a system count, and wherein the guest OS is paravirtualized to return a scaled version of the virtual count based on the scaling factors of the guest virtual counter in response to a call by the application to read the virtual count register.

19. The virtualized computing system of claim 15, wherein the host virtual counter and timer includes a virtual count register tracking a virtual count offset from a system count and a virtual timer comparing against the virtual count, and wherein the guest OS is paravirtualized to write a scaled version of a compare value to the virtual timer based on the scaling factors of the guest virtual counter in response to a call by the application to write to the virtual timer.

20. The virtualized computing system of claim 15, wherein the hypervisor is configured to:
    update the scaling factors of the guest virtual counter while the VM is powered on.

* * * * *